Figure 2:
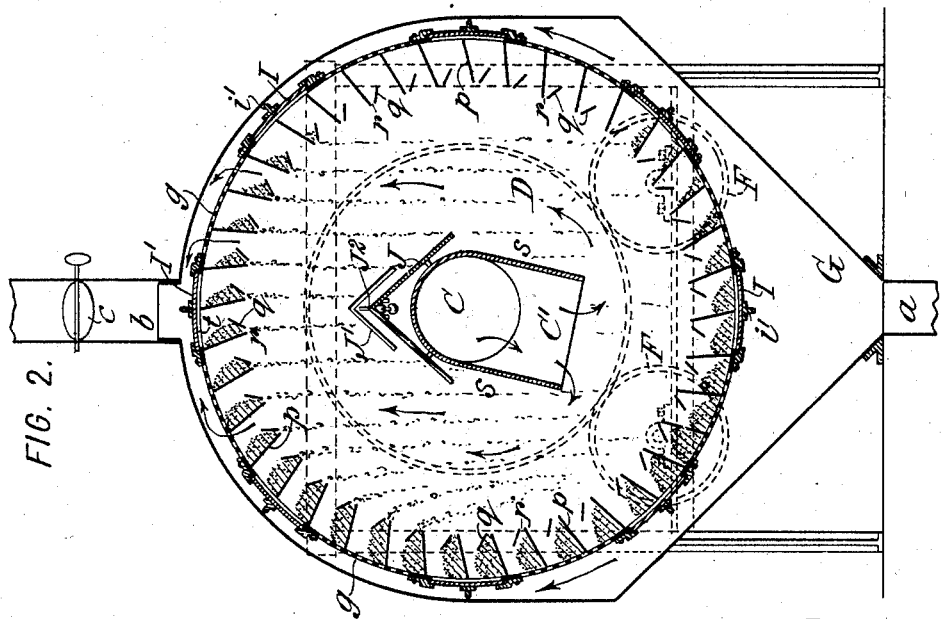

No. 719,717. PATENTED FEB. 3, 1903.
J. ARBUCKLE.
APPARATUS FOR ROASTING COFFEE.
APPLICATION FILED APR. 25, 1900.
NO MODEL.

WITNESSES:
Fred White
Thomas F. Wallace

INVENTOR:
John Arbuckle,
By Attorneys,

# UNITED STATES PATENT OFFICE.

JOHN ARBUCKLE, OF BROOKLYN, NEW YORK, ASSIGNOR TO ARBUCKLE BROTHERS, OF NEW YORK, N. Y., A FIRM.

APPARATUS FOR ROASTING COFFEE.

SPECIFICATION forming part of Letters Patent No. 719,717, dated February 3, 1903.

Original application filed April 22, 1897, Serial No. 633,244. Divided and this application filed April 25, 1900. Serial No. 14,316. (No model.)

*To all whom it may concern:*

Be it known that I, JOHN ARBUCKLE, a citizen of the United States, residing in Brooklyn, in the county of Kings and State of New York, have invented certain new and useful Improvements in Apparatus for Roasting Coffee, of which the following is a specification.

Coffee is ordinarily roasted by placing it in a long perforated cylinder of comparatively small diameter and revolving it slowly over a fire. The burning of the coffee is prevented by the rotation of the cylinder, which keeps the mass in constant movement, and the mass is further agitated or stirred by means of spiral blades mounted within the cylinder, which act upon the coffee, which is partly carried up the ascending side of the cylinder, to throw it first toward one end and then toward the other. It results from this construction that the coffee is roasted practically *en masse*, there being but little circulation of the fire-gases through the coffee and the individual beans or berries being roasted while in contact with other beans or berries and the roasting operation taking place chiefly with respect to those beans which are momentarily at the bottom of the mass next the perforated wall of the cylinder. The roasting of the coffee in the customary manner is subject to the inherent disadvantage that the escape of the moisture and offensive matters driven off or distilled from the coffee is impeded by the aggregation of the coffee berries or beans in a mass or pile, so that those at the lower part of the pile, where the most active roasting operation takes places, are covered and smothered by the superincumbent mass. The moisture which is driven to the surface of the beans by the heat is not vaporized and driven off as rapidly as is desirable, but remains upon the surface and within the interstices formed by the contact of each bean with those surrounding it.

My invention aims to realize as nearly as practicable an ideal in coffee-roasting—namely, that each bean shall be separately roasted by being surrounded on all sides by the hot air or fire-gases and while out of contact with other beans. By this means the expulsion of the matters which are driven off from the bean by the heat is not obstructed by the presence of other beans in contact with it. To this end I shower the coffee through a current of hot fire-gases in a stream sufficiently open to keep the beans separated as they fall, so that each one shall be surrounded on all sides by the hot gases, and I provide an upward current of hot fire-gases through and surrounding the shower of coffee. These results may be attained in different ways; but I prefer the employment of a drum of large diameter, into which the fire-gases are admitted concentrically, with its axis at one side therein and directed downward, so that from their entrance at the lower part of the drum they shall ascend therein and escape around the periphery thereof, chiefly at the upper side, the drum being provided with plates or buckets within it, near its periphery, adapted to receive the falling coffee and carry it up the ascending side of the drum and to shower it from the upper side in small streams, so as to secure a thorough subdivision of the coffee. For obtaining a forced current of fire-gases I employ a blower or fan, which might be connected with the outlet to draw the gases through the suction; but I prefer to employ such blower to blow air under a slight pressure beneath the grate of the furnace, so that the fire-gases are forced by pressure into the perforated drum, and to maintain it under a slight compression therein by choking their exhaust from the casing within which the drum revolves.

The preferred construction of my improved apparatus is shown in the accompanying drawings, in which—

Figure 1:
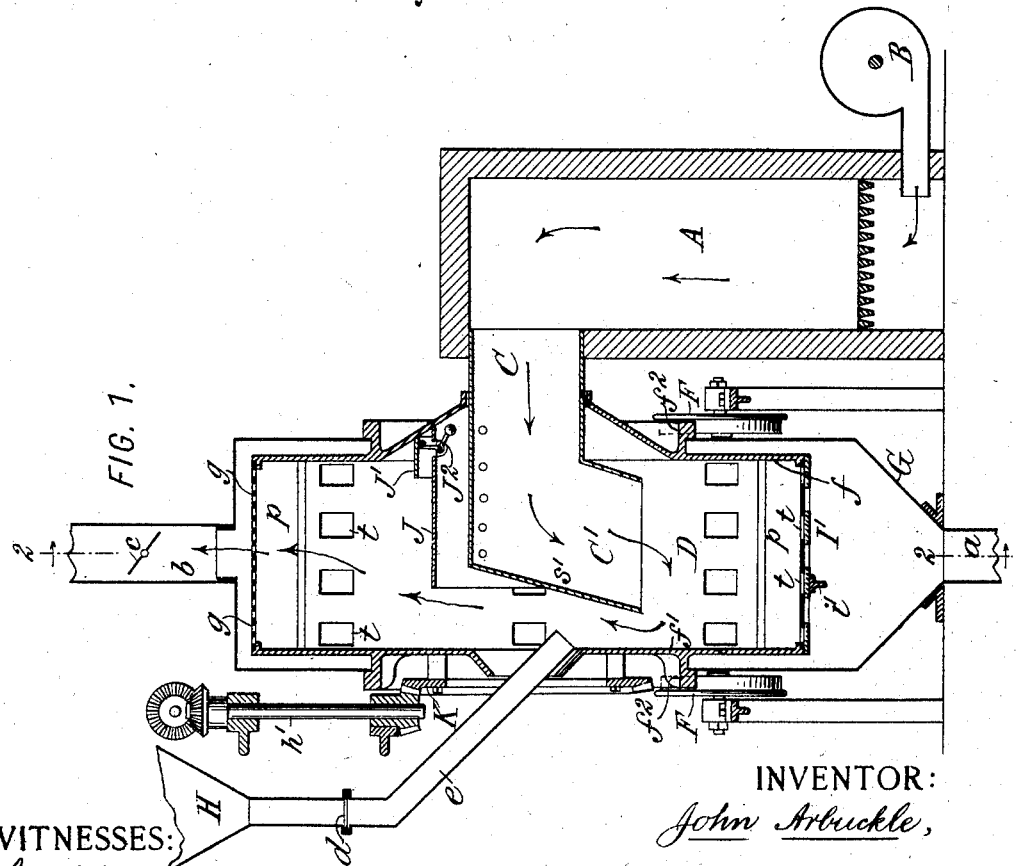

Figure 1 is a vertical diametrical section of one form of apparatus, of which Fig. 2 is a vertical transverse section on the line 2 2.

Referring to the drawings, let A designate a furnace of any suitable construction into which air is blown by a fan or blower B, and the fire-gases are expelled under pressure through a flue or pipe C into the roaster. As shown, the combustion-chamber of the furnace immediately adjoins the roasting-drum. The latter consists of a drum D, preferably cylindrical and mounted in any suitable manner, so as to revolve, made of large diameter in proportion to its length, and having a mouth opening directly into its interior and communicating with the interior of the combustion-chamber. The drum is inclosed by a casing G, having a bottom outlet $a$ for discharging the roasted coffee, and an outlet-flue $b$ on its top for the escape of waste fire-gases, a damper $c$ being provided for graduating the effective area of this flue.

The coffee is stored in a bin or hopper H, from which by opening a slide $d$ it may descend through a chute or spout $e$ into the roasting-drum.

In the particular construction here shown the drum is formed with end plates $f f'$, which are imperforate, and with a peripheral portion $g$, of perforated sheet metal or of wire-cloth or other foraminous material, the perforations being small enough to prevent the escape through them of the coffee-beans. The perforated portion $g$ is shown as made cylindrical. The end plates $f f'$ of the drum are both formed with annular flanges or rails $f^2$, which roll on supporting-wheels F F, the drum being driven by a bevel-gear K, with which meshes a bevel-pinion on a driving-shaft K', driven in any suitable manner.

The outer portion of the drum is constructed with agitators in the form of partitions or buckets for carrying the coffee up the ascending side of the drum and showering it from the upper side thereof in as nearly as possible uniform streams of coffee, which fall through the central portion of the drum to the lower part, as approximately indicated in Fig. 2, thereby filling the central part of the drum with incessant falling streams of coffee-beans. These buckets are formed of plates $p\ p$, arranged either radially or preferably somewhat tangentially and arranged around the inner periphery of the drum, as shown in Fig. 2. If these plates alone were used, the coffee which is carried up by them would slide off suddenly from each plate upon its reaching approximately the angle of repose of the coffee, so that there would be a series of sudden falls of compact masses of coffee, much as is the case with existing coffee-roasters, instead of the coffee being subdivided into a continuous rain of coffee-beans, as is the object of my invention. To attain this object, therefore, I provide each plate $p$ with a segmental plate $q$, arranged to prevent the coffee sliding off *en masse* from the plates $p$ and adapted to retain on each plate the mass or pile of coffee, permitting the latter to sift out slowly through an opening $r$ between the plates, this operation being indicated with a somewhat close approximation to accuracy in Fig. 2. Hence the masses of coffee are retained on the plates $p$ until the latter pass the vertical, their weight being more and more transferred to the plates $q$ and the quantity of each mass becoming progressively less by the slow outpouring of coffee through the slits $r$ until on the descending side the coffee has all been discharged from the plates. The flames and intense heat direct from the furnace entering the drum through the flue C circulate within the drum and surround on all sides the individual coffee-beans of the falling streams therein, whereby the beans are roasted in transit or while falling, the fire-gases distributing themselves around the drum and escaping through the perforated portions thereof into the casing G, from which they escape by the outlet $b$. Their escape may be more or less retarded by the valve $c$, by which a slight pressure of hot gases may be maintained in the drum and the gases be forced to dwell therein for an appreciable time, sufficient to intensify their roasting action. To prolong the roasting action of the gases, I extend the flue C into the drum and turn it downwardly therein, as indicated at C', the flue extension consisting of side walls $s\ s$ and an end wall $s'$. The flue extension preferably extends obliquely, as is shown in Fig. 2, in order to direct the entering gases to a point as far as possible from that which affords them the most ready egress. With this construction there would be liability that part of the falling coffee would lodge on the top of the portion of the flue extending within the drum, which being hot would burn the coffee, and to prevent this I protect the flue by placing over it a sloping deflector or roof J, having an angle sufficient to discharge any coffee that will fall upon it, and supported from the flue C at a little distance therefrom, so as to avoid being heated thereby unduly. As it is impracticable to construct a drum of this character to revolve with absolute accuracy, it is consequently impossible to make a close fit between the end of such roof J and the end plate $f$ of the drum, so that there would be liability of coffee-beans falling through the space between them and lodging on the flue C, and to prevent this I have devised a supplemental movable deflector-plate J', mounted just above the plate J, resting loosely thereon and pressed yieldingly toward the wall $f$, with which its edge makes consequently a close and true fit, such as to prevent the passage between them of any coffee-beans. To maintain it in yielding contact with said end plate, I provide by preference a weighted elbow-lever $J^2$, loosely pivoted to ears turned in from the plate J and having its upwardly-projecting arm engaging a downward projection on the under side of the plate J', so that by pushing against this projection with a pressure determined by the weighted arm of the lever it exerts a thrust against the movable plate to force it into contact with the end plate of the drum.

For discharging the roasted coffee the casing is made with rows of openings $t\ t$ at intervals, which openings are closed by slides I', the exterior of each slide having a projection $i'$, by which it may be engaged by any suitable means in order to displace it longitudinally sufficient to make the openings in the slide register with the openings *t t* in the drum, and thereby permit the coffee to fall out. In discharging the coffee in this manner the slides are opened successively as the drum revolves and are all left open during one or two turns of the drum or for sufficient time to permit all the coffee to fall out. Before introducing the next charge of coffee these slides are closed, whereupon on opening the slide *d* coffee is introduced through the chute *e*, which projects obliquely into the drum.

This application is a division of my application No. 633,244, filed April 22, 1897.

I claim as my invention—

1. An apparatus for roasting coffee consisting of a revolving drum having means for elevating the coffee and showering it in a distributed rain of beans through a current of hot fire-gases, so as to substantially fill the free space within the drum with the falling beans, combined with a furnace and blower for circulating the hot fire-gases therefrom through said drum whereby to roast the beans individually while falling through the hot gases.

2. An apparatus for roasting coffee, consisting of a revolving drum having peripheral plates or buckets adapted to carry up the coffee and shower it in a distributed rain of beans from the entire upper side of the drum through the central portion of the drum, so as to substantially fill the free space within the drum with the falling beans, combined with a furnace and a blower adapted to maintain an upward current of hot fire-gases in contact with the falling coffee whereby to roast the beans individually while falling through the hot gases.

3. An apparatus for roasting coffee consisting of a revolving drum having a perforated peripheral portion and having peripheral buckets adapted to carry up the coffee on the ascending side of the drum, and constructed to afford a restricted outlet through which the coffee may fall while the buckets are passing over the upper side of the drum, whereby the coffee is showered in a distributed rain of beans through the central portion of the drum, so as to subsantially fill the free space within the drum with the falling beans, combined with a furnace and means for circulating the hot fire-gases therefrom into and upwardly through said drum whereby to roast the beans individually while falling through the hot gases.

4. An apparatus for roasting coffee consisting of a revolving drum having a perforated peripheral portion, and having peripheral buckets formed by plates *p p* and auxiliary plates *q q*, arranged with spaces *r r* between them, through which the coffee may fall in graduated streams, combined with a furnace, and means for circulating the fire-gases therefrom through said drum.

5. In an apparatus for roasting coffee, the combination with a short revolving drum of relatively large diameter, having its peripheral portion perforated, of a furnace, a flue therefrom entering the center of said drum and extending downwardly therein to direct the entering fire-gases downwardly in the drum, a casing inclosing said drum, and a flue leading from the upper part of the casing.

6. In a coffee-roasting apparatus, the combination with a drum, and a fire-gas flue entering said drum centrally through one end, with means for preventing burning of coffee by its lodgment on said flue, consisting of a deflector-plate J mounted over said flue within the drum.

7. In a coffee-roasting apparatus, the combination with a drum, and a fire-gas flue entering said drum centrally through one end, with means for preventing burning of coffee by its lodgment on said flue, consisting of a deflector-plate J mounted over said flue within the drum, and a supplemental plate J' movable over said plate J, and means for yieldingly pressing it into contact with the end of the drum.

8. In a coffee-roasting apparatus, the combination with a drum, and a fire-gas flue entering said drum centrally through one end, with means for preventing burning of coffee by its lodgment on said flue, consisting of a deflector-plate J mounted over said flue within the drum, a supplemental plate J' movable over said plate J, and a weighted lever $J^2$ for yieldingly pressing said plate against the end of the drum.

In witness whereof I have hereunto signed my name in the presence of two subscribing witnesses.

JOHN ARBUCKLE.

Witnesses:
D. B. WOOD,
M. F. WALSH.